United States Patent

[11] 3,612,963

| [72] | Inventors | John Piper;<br>Lawrence E. Nordquist; Reinhardt C. Frederick Hanold, III, all of Greenville, S.C. |
|---|---|---|
| [21] | Appl. No. | 18,470 |
| [22] | Filed | Mar. 11, 1970 |
| [45] | Patented | Oct. 12, 1971 |
| [73] | Assignee | Union Carbide Corporation<br>New York, N.Y. |

[54] MULTILAYER CERAMIC CAPACITOR AND PROCESS
5 Claims, 8 Drawing Figs.

[52] U.S. Cl. .................................................. 317/261,
29/25.42, 317/101 CC
[51] Int. Cl. ...................................................... H01g 1/00
[50] Field of Search .......................................... 174/68.5;
317/261, 242, 101 CC, 101 CM, 261, 242, 101;
204/15; 338/322, 307-312; 29/25.42

[56] References Cited
UNITED STATES PATENTS

| 2,395,442 | 2/1946 | Ballard ........................ | 317/261 X |
| 3,378,704 | 4/1968 | Miller et al. .................. | 317/261 X |
| 3,444,436 | 5/1969 | Coda ............................ | 317/261 X |

*Primary Examiner*—Darrell L. Clay
*Attorneys*—Paul A. Rose, Harrie M. Humphreys, Frederick J. McCarthy, Jr. and Robert C. Cummings ABSTRACT: Multilayer ceramic capacitors having improved end metallization coatings comprising fired-on silver-frit coatings contacting the internal electrodes exposed at each end of the capacitor and extending over onto a side face thereof to form two spaced-apart bonding pads, and thin electroplated copper coatings conformally covering the silver coatings.

3,612,963

INVENTORS
JOHN PIPER
LAWRENCE E. NORDQUIST
REINHARDT C.F. HANOLD III
BY Leo A. Plumb, Jr.
ATTORNEY

MULTILAYER CERAMIC CAPACITOR AND PROCESS

This invention relates to an improved multilayer ceramic capacitor and to an improved process for the production thereof.

The multilayer ceramic capacitor is finding increased use in electronic equipment requiring capacitors of low to medium capacitance values with good volumetric efficiency, and which are suited for automated assembly into such equipment. One such application is in miniature hybrid circuit modules. Such modules generally comprise small ceramic substrates having active and passive functional components thereon as a combination of thin or thick film elements and deposited components, all connected by a printed wiring pattern. Such modules have already found use in computer apparatus and in various other industrial, military and commercial equipment; and now there is developing interest in the use of such modules in electronic entertainment equipment, including radios, television, phonographs, etc. Multilayer ceramic capacitors would appear to be ideally suited for use as the deposited components in such modules because of their small size, high reliability, relatively low cost, and most particularly, because of the suitability of such capacitors for automatic handling and assembly into hybrid circuit modules.

Multilayer ceramic capacitors are somewhat temperature sensitive however and care must generally be exercised to limit the temperature and time of any soldering operation by which the ceramic capacitors are affixed to the substrate. This temperature-sensitivity places a limit on the usefulness of the ceramic capacitors in hybrid circuit module production, since such modules are often exposed to higher temperatures, for example, where reflow-soldering techniques are used to join the various components to the substrate.

The existence of a temperature sensitivity in multilayer ceramic capacitors is anomalous in view of the fact that such capacitors are formed by firing or sintering at temperatures of over 2,000° F. a body composed of alternate layers of ceramic dielectric material and noble metal materials. The noble metal layers form the plates or electrodes of the capacitor and are arranged such that alternate electrodes will be exposed at opposite ends of the capacitor body. A metallic coating is then applied to each end of the capacitor body to connect each set of electrode layers in parallel and to provide termination means whereby the capacitor may be soldered into a hybrid circuit or have leads soldered thereto. This end metallization on the ceramic capacitor body is generally a fired-on mixture of silver particles and a glass frit which bonds the silver particles to the ceramic body. This silver end metallization coating is adherent, of low resistance and inductance, and highly solderable. However, because of the high solubility of silver in lead-tin solders, the rate of which increases with the increasing temperature, the silver particles are scavenged out of the coating during exposure to molten solder, leaving a poor connection and a high-resistance contact. It is therefore generally necessary to limit the temperature and time of any soldering or other metal-joining operation when such ceramic capacitors are involved. In the reflow-soldering process, which is often used in the production of hybrid circuit modules, it is difficult to so limit the time and temperature of the exposure of the ceramic capacitors to molten solder. As a result, such silver-metallized ceramic capacitors cannot generally be used in reflow-soldered hybrid circuits. In attempts to alleviate this scavenging of the silver from the end metallization, solders containing about 2 percent silver are employed, but the degree of added protection is not substantial. An alternative solution is to employ an end metallization mixture which contains palladium as well as silver particles. The palladium-silver metallization has a higher degree of resistance to the solder but the cost of this type metallization is about 10 times that of a straight silver, a factor which tends to inhibit the use of such ceramic capacitors in any but the more expensive equipment.

It is the object of this invention therefore to provide an improved multilayer ceramic capacitor having a greater resistance to high-temperature conditions.

It is another object of this invention to provide improved multilayer ceramic capacitors specially adapted for use in hybrid circuit modules.

It is also an object of this invention to provide improved multilayer ceramic capacitors which utilize the relatively inexpensive silver end metallization of the prior art but which are given increased protection from the scavenging of the silver from said metallizations by molten solder.

It is also an object of this invention to provide an improved process for producing the multilayer ceramic capacitors described above.

Other aims and advantages of this invention will be apparent from the following description, the appended claims and the attached drawings.

SUMMARY OF THE INVENTION

In accordance with these objects, an invention is provided comprising an improved multilayer ceramic capacitor body formed of stacked and sintered alternately arranged layers of ceramic dielectric material and metallic electrode material with alternate electrode layers disposed at opposite ends of the body, metallized coatings on the opposite end faces of the body making electrical contact to the electrode layers disposed at the respective ends, said metallized coatings each extending over at least one edge to each partially overlap a portion of at least one side face of said body to form two spaced-apart solderable bonding pads on said face, said metallized end coatings each comprising a fired-on layer of silver particles bonded to the body by a ceramic frit and a thin copper film conformally coating the silver layers, i.e. extending continuously over the silver layer on the end face, the bonding pad portion on the side face and the edge therebetween. More particularly the thin copper film is an electroplated copper film having an average thickness in the range of from 0.1 to 0.5 mils, a mil being one-thousandth of an inch.

The so-formed multilayer ceramic capacitor may be thereupon provided with solder coatings over the metallized ends of the body whereupon the thin copper films form alloy diffusion barriers with the solder and thereby prevent scavenging of the underlying silver layers by the molten solder. The solder-coated capacitors may then be soldered onto the metallized lands of a ceramic substrate by depositing the capacitor on the substrate with the solder-coated bonding pad portions resting on the appropriate metallized lands, also preferably solder coated, and heating the assembly to cause the solder to flow and make the bond. Or the multilayer ceramic capacitor having the thin copper films exposed on the bonding pad portions may be directly soldered onto a substrate by applying molten solder between the bonding pad portions of the capacitor body and the appropriate metallized lands. An alloy diffusion barrier will form between the copper and the solder to prevent scavenging of the underlying silver layers by the molten solder.

The invention also includes the method of providing solderable end metallizations on multilayer ceramic capacitors comprising providing a multilayer ceramic capacitor body formed of stacked and sintered alternately arranged layers of ceramic dielectric material and metallic electrode material with alternate electrode layers disposed at opposite ends of the body, forming a fired-on silver particle containing coating on the opposite end faces of the body making electrical contact to the electrode layers disposed at the respective ends, said silver coating being formed to extend over at least one edge to partially overlap a portion of at least one side face of the body to form two spaced-apart bonding pads on said face, and electroplating a thin copper coating over the silver coatings to conformally cover said silver by immersing the capacitor in a copper electroplating solution and making cathode connections to the silver coatings at each end of the capacitor body and supplying copper anions from a copper anode. The electroplating solution is preferably an acid copper sulfate electroplating solution having a high throwing power whereby bright, adherent and highly solderable copper films are deposited on the silver end coatings.

DESCRIPTION OF THE PREFERRED EMBODIMENTS

Figure 1:
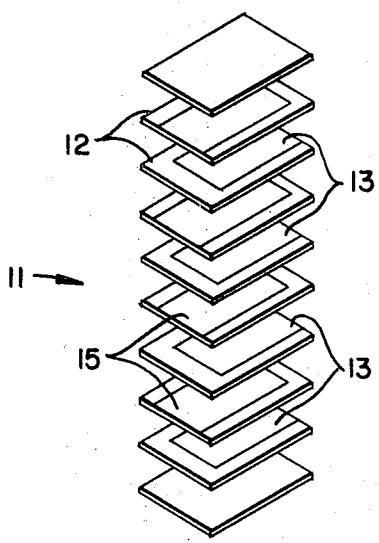
FIG. 1 is a schematic perspective view, not to scale, of an unassembled stack of unfired ceramic plates having metal electrode patterns formed on the inner plates in an arrangement such that alternate electrode layers are disposed at opposite ends of the stack.

Referring to FIG. 1, an unassembled stack 11 of ceramic sheets 12 is shown. The interior sheets 12 are provided with metallic electrode layers 13. The stack 11 is then pressed together and sintered to form the rectangular block-type ceramic capacitor 14 shown in FIG. 2. The fabrication of such capacitors is well known in the art and is only summarized here. Basically the ceramic dielectric material can be of many different formulations depending on the desired end properties. The ceramic dielectric formulations normally used consist of barium titanate as the major constituent with varying percentages of one or more alkaline earth oxides, titanates, zirconates or stannates and minor additions of other metallic oxides.

The ceramic raw material is ground to a fine powder and then blended with suitable resins, solvents and plasticizers to make a castable mixture. This mixture is cast into the form of large thin sheets which are then dried. The large sheet can be then cut into the thin sheets 12 which make up the capacitor, or as is the more usual practice, a pattern of electrode layers are first provided on the large sheets before they are cut into the smaller sized capacitor sheets 12.

The electrode layers 13 can be provided by screen printing, or otherwise metallizing, selected portions of the surface of the ceramic sheet with an electrode material in the form of a paste consisting of one or more powdered noble metals mixed with suitable resins, binders, solvents, etc. The electrode registration pattern is such that alternate electrode layers or electrodes will be exposed on opposite ends of the ceramic block when the thin sheets are cut and stacked. As seen in FIG. 1, the alternate electrodes 13 are disposed at the far end of the stack and the alternate electrodes 15 are exposed at the near end of the stack.

The top and bottom sheets may be left unprinted so that, on pressing of the sheets, these outer sheets will seal the unit.

The stack of individual printed ceramic sheets is then pressed into individual blocks such as 14 and then fired or sintered. Or, if the large sheets of ceramic material have not yet been cut into small capacitor-sized sheets, then a set of large sheets each having appropriate rows of electrode patterns may be stacked with the electrode patterns in proper registry, pressed and fired, and thereafter cut to provide the individual capacitor bodies 14.

The firing of the blocks or stacked sheets is generally conducted at temperatures of at least 2,000° F. for periods of more or less an hour. The fired capacitor body is nonporous, dense and mechanically rigid as the firing or sintering process burned away all of the organic components and caused the ceramic particles to sinter into a solid polycrystalline system. The electrode layers are composed of selected noble metals which will not be adversely affected by the firing temperatures nor react with the ceramic materials. These electrodes may be considered thin continuous metal films separated by the ceramic dielectric layers.

Figure 2:
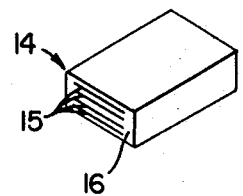
FIG. 2 is a schematic perspective view, not to scale, showing the multilayer ceramic capacitor resulting from the assembly, pressing and firing of the plates illustrated in FIG. 1 to form the body shown with a set of electrode layers disposed at one end face of the body, each separated by a double thickness of ceramic dielectric material therebetween covering one of the alternate electrode plates, the overlapping areas of the alternating electrode layers defining the plates of the capacitor.

The procedures outlined above for fabricating the fired ceramic capacitor body of FIG. 2 are only some examples of the possible methods for making multilayer ceramic capacitors which can be benefited by the teachings of this invention. Other procedures than those discussed here can also be used to make the same basic type of capacitor illustrated in FIG. 2.

Referring to the fired ceramic capacitor body 14 in FIG. 2, it is seen that the alternate electrodes 15 are gathered and exposed at the near end 16 of the block while the intervening electrodes are gathered at the opposite end of the block. The edge exposure of these electrode layers can be enhanced if desired by grinding or otherwise removing a small portion of the ceramic material on end faces, such as at 16, to further expose the edge of the metal layers 15. Metallized coatings 17 and 18 are then applied over each end face, as shown in FIG. 3, in order to provide an electrical parallel connection of the electrodes at each end of the unit and to form an external end termination whereupon lead wires may be attached to the capacitor body or more particularly, whereby the capacitor can be soldered onto the metallized lands on a substrate.

The metallized coatings produced according to this invention comprise two layers. The first layer is a silver-containing coating, and the second layer is a conformal copper film over the silver. The underlying silver layer, which is directly bonded to the ceramic surfaces, can be a conventional silver-containing conductive metal system, for example, a mixture of silver particles, glass or other vitreous frit particles, an organic binder, and a vehicle for the binder. This pastelike mixture is applied by dipping, wheel, brush or any other means to the exposed ends of the capacitor body so as to coat the ceramic material there and cover the exposed ends of the electrode layers. After drying, the silver material is fired by exposing the so-coated capacitor to temperatures of about 1,400° F., depending on the type of frit, to fuse the frit and bond the silver to the ceramic.

Figure 3:
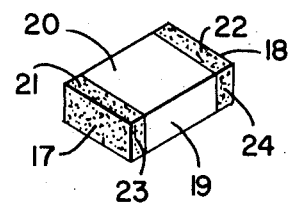
FIG. 3 is a schematic perspective view similar to FIG. 2 now showing a silver-containing end coating formed at each end of the capacitor body making contact to and connecting in parallel the alternate electrode layers at each end of the unit.

The silver coatings 17 and 18 are seen to cover the end faces of the body and also to partially overlap the sides thereof 19 and 20 as well as the sides not visible in FIG. 3. The strips 21 and 22 on the upper side face 20 of the body can be used as planar bonding ends whereby the capacitor body may be deposited on metallized lands on a substrate with the pads 21 and 22 each in engagement with an appropriate land and then soldered thereto to make a mechanical bond and to form an electrical connection from the lands through each bonding pad to the metallized coating on the end face of the unit which in turn contacts the exposed edges of the capacitor's internal electrodes. The overlapping strip portions generally extend around all sides of the capacitor since it is convenient to form these end termination coatings by merely dipping the ends of the capacitor body in the silver paste, which causes the paste to overlap the sides. Additionally, by having the overlapping strip portions on each face of the capacitor body, the capacitor can be deposited on the substrate lands with any desired side of the capacitor facing downwards. For example, the capacitor could also be mounted on the substrate with the side 19 facing downwards using the strip portions 23 and 24 as the bonding pads.

Figure 4:
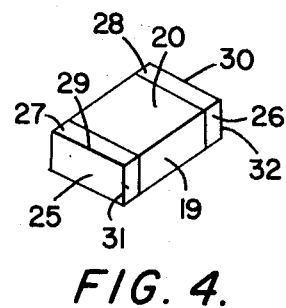
FIG. 4 is a view similar to that of FIG. 3 now showing conformal copper coatings over the silver end coatings to complete the improved end metallization system of this invention.

The fired-on silver end termination system formed as described above makes a contact or bonding pad which is of low resistance and inductance, and which is directly solderable. However, according to the present invention, this silver coating on the ends of the capacitor body are not utilized as directly solderable bonding sites, but rather a second metallized layer is formed over the surface of the silver coating. As seen in FIG. 4, copper films 25 and 26 have been formed over the ends of the capacitor body. The copper films cover the end faces of the capacitor body, only the near face being shown, and additionally, the copper films at each end of the body overlap the side faces thereof in strips 27 and 28 which cover the previously formed silver strips 21, 23, 22 and 24. It is an important aspect of this invention that the copper films 25 and 26 at each end of the capacitor body completely cover the silver coatings there, and that the copper film extend continuously as a sheetlike film over the end face, across the edge thereof and onto the overlapping strip portion of the silver coating on at least the side face of the capacitor intended to be used as the bonding face. Referring to the near end face of the capacitor body of FIG. 4, the copper film 25 is seen to extend continuously as a coating over the end face itself, across the edge 29 and then over the strip portion 27 on the side face 20 of the body. The copper film on the opposite end of the capacitor body similarly extends continuously over that end face, across the edge 30 and onto the strip portion 28 on the side face 20. In this way the copper-covered strip portions 27 and 28 on the face 20 of the capacitor body can be used as the planar bonding sites for attachment of the capacitor body to the lands on a substrate. Additionally, if it is desired to use the face 19 of the capacitor as the bonding face, then the copper films 25 and 26 should extend continuously from the end faces and across the edges 31 and 32 to cover the overlapping portions of the silver coating on face 19.

In the preferred embodiment of this invention the copper films at each end of the body are made to cover the end faces and also to overlap all of the side faces in the form of a narrow strip coextensive with and covering completely the underlying silver coating at each end. The copper film can thus be referred to as a conformal coating over the silver coating, i.e. a copper film of the same shape as and covering the surface of the silver.

Figure 5:
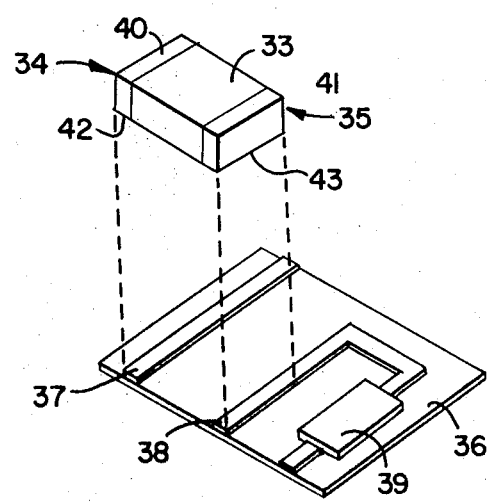
FIG. 5 is a schematic, exploded view of a fragment of a hybrid circuit substrate having printed wiring thereon and a multilayer ceramic capacitor of this invention about to be mounted thereon.

Referring to FIG. 5 the so-formed capacitor 33 having an end metallization system consisting of underlying silver coatings having conformal copper coatings 34 and 35 thereon is now complete and can be soldered to a substrate 36. The substrate 36, only a fragment of which is shown, is seen to have a printed wiring pattern thereon including metallized lands 37 and 38 which are spaced apart a proper distance to receive the copper-coated bonding pads 42 and 43 of the capacitor body 33. Other circuit elements such as at 39 may be formed or deposited on the substrate and connected to the capacitor by the printed wiring pattern.

As an aid to soldering, the conformal copper coatings 34 and 35 on the capacitor 33 may be first provided with solder films 40 and 41. The solder coatings may be applied by dipping the entire capacitor body 33 in a pot of molten solder whereby the solder will adhere only at the copper-coated ends and not on the intervening ceramic portions. The lands 37 and 38 may additionally have been provided with solder coatings. To make the solder connection, the capacitor 33 is deposited on the substrate 36 with the solder-coated bonding pads 42 and 43 in engagement with the solder-coated lands 37 and 38, respectively, and heat applied to cause the solder to flow and form the connection. Soldering flux may have been placed between the lands and the bonding pads on the capacitor as needed. It is not essential that the copper-coated ends of the capacitor have been precoated with solder. Instead, solder preforms could have been placed between the lands and the bonding pads and heat applied to melt and flow the solder with the same result.

Figure 6:
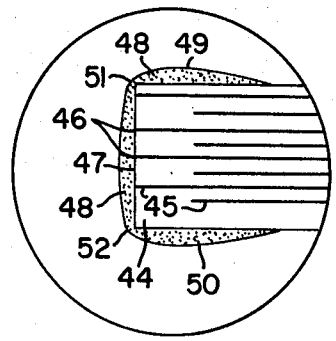
FIG. 6 is a magnified cross-sectional view of the end portion of a multilayer ceramic capacitor having a silver end coating thereon, not necessarily to scale and exaggerated for the purpose of illustrating the problems involved.
Figure 7:
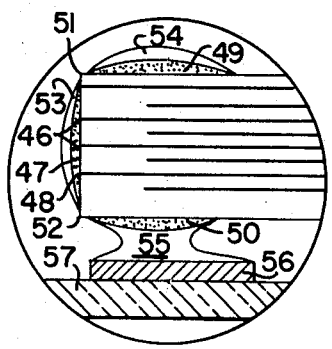
FIG. 7 is a magnified view similar to FIG. 6 now showing the results of soldering the silver-end coated capacitor of FIG. 6 to a substrate.
Figure 8:
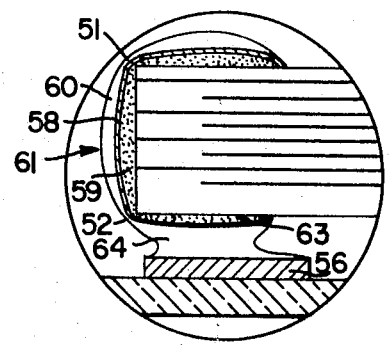
FIG. 8 is another magnified view similar to those of FIGS. 6 and 7, but now showing a capacitor having the improved end metallization system of this invention soldered to a substrate.

The advantages of the metallization system of this invention may be understood by reference to FIGS. 6, 7, and 8. These are magnified schematic cross sections of the end portions of a capacitor body shown not necessarily to scale and exaggerated to illustrate the problems involved and the solution afforded by this invention. In FIG. 6, an end portion 44 of a multilayer ceramic capacitor is shown. The internal electrodes 45 are seen with alternate electrodes 46 exposed at the left end face 47 of the body. The silver-glass frit coating 48 is seen to cover the end face 47 as well as to overlap the top and bottom sides of the capacitor in the form of strips 49 and 50. Since this silver-glass frit coating is first applied to the end of the capacitor as a flowable paste, it is subject to surface tension forces as well as the normal shrinkage resulting from firing of the paste, with the result that the silver coating has drawn away from the edges 51 and 52 leaving much thinner coatings there than over the flat surfaces at 47 and under the central portion of the top and bottom coatings 49 and 50.

If a capacitor having only the silver end termination shown in FIG. 6 is directly soldered onto a substrate, as now shown in FIG. 7, either with or without a solder precoat, there is the danger that the molten solder will attack the silver coating, particularly in the vicinity of the edges 51 and 52 and scavenge or dissolve the silver therefrom leaving the edges bare of metal. The molten solder, being nonwettable on the bare ceramic at the edges 51 and 52 and being itself subject to surface tension forces, will tend to draw up into separate globules 53, 54 and 55. While the mechanical connection of the capacitor to the land 56 on the substrate 57 will be made through the solder body 55, there will be no continuous electrical path between the land 56 and the end metallization 48 which contacts the internal electrodes 46 of the capacitor. This is because the solder body 53 and silver metallization 48 on the end face 47 does not extend over the edge 52 to the solder body 55 and silver metallization 50 on the bonding pad, due to the scavenging of the silver coating from this end. The condition shown in FIG. 7 of a complete open between the end metallization 48 and the bonding pad 50 is an extreme one and would be the result only of prolonged exposure of the silver-coated capacitor to molten solder or to a high-temperature solder. However, any degree of scavenging of silver from the edges of the capacitor body can be undesirable in that the resulting discontinuities make the electrical path more resistive. It is therefore necessary to employ caution when soldering ceramic capacitors having such silver end terminations. In many soldering operations however, such as in reflow soldering, it is not always possible to so limit the time and temperature of the exposure of the silver end terminations to molten solder, with the result that excessive scavenging does occur and the solder connection while apparently mechanically sound, proves to be electrically defective. Additionally, the solder joint often proves to be weak as well.

Referring now to FIG. 8, there is shown the improved ceramic capacitor of this invention having a conformal copper coating or film 58 on the underlying silver end coating 59. The capacitor had been solder dipped before bonding to the substrate to form the solder coat 60. The intervening copper conformal coating 58, being less subject to attack by the molten solder, has not been scavenged away and in fact, has formed a solder-copper alloy diffusion barrier at the interface of the solder and the copper film. Since the solder does not penetrate this diffusion barrier, the underlying silver coating 59 is not wet by the solder and is not scavenged. The silver coating thus remains intact at the edges 51 and 52 and a continuous low-resistance electrical path exists in the form of a three-layer coating of solder 60, the conformal copper coating 58 and the underlying silver coating 59 extending from the end face 61 across the edge 52 and on to the bonding pad portion 63 on the underside of the capacitor where the solder body 64 bonds and electrically connects the capacitor to the land 56.

The fact that metals such as nickel, and to a lesser extent copper, are more resistant to scavenging attack by molten solder than silver is known. It is the unexpected finding of this invention that a thin copper conformal coating will form a diffusion barrier with the solder preventing exposure of the underlying silver to the solder even when the capacitor is exposed to temperatures as high as 265° C. for time periods of 10 minutes or more, which is about the limit of the high-temperature conditions to be encountered in a reasonably controlled reflow-soldering operation. The exposure of a silver end terminated capacitor not having the thin conformal coating of this invention to the same temperature conditions would result in a severe scavenging of the silver and impairment, if not destruction, of the electrical capabilities of the device.

The conformal copper coatings of this invention are preferably of an average thickness of from 0.1 mil to 0.5 mil, it being understood that the exact thickness of copper may vary from point to point. Average thicknesses under 0.1 mil do not provide adequate resistance, and thickness of copper over 0.5 mil may tend to act as separate sheets having a different coefficient of expansion than the underlying silver and hence tending to separate therefrom. Conformal copper coatings of an average thickness of 0.2 or 0.3 mils are highly satisfactory.

It would not normally be expected that such slight thicknesses of copper would themselves be capable of withstanding attack by the molten solder. It would normally be assumed that considerably heavier copper coatings and even coatings of more solder resistance metals such as nickel or multiple copper-nickel coatings would be required to give the desired degree of protection to the underlying silver material. It is an advantage of this invention therefore that such a high degree of resistance to solder attack can be afforded the ceramic capacitors by such a thin conformal copper coating. It is particularly advantageous because: a thin copper coating takes less time to apply than a heavier or multiple metal coatings; is more adherent and less subject to delamination than heavier or multiple metal coatings; and because a copper surface is much more solderable than a surface of a more resistant metal such as nickel.

The copper conformal coatings are preferably produced on the silver end terminations by electroplating whereby a smooth, adherent conformal copper film is formed. It has been found that a smooth or bright copper film is preferred since it is more wettable by solder than a rough copper film where the solder does not fill the crevices but bridges over them in a less adherent coating. These highly solderable bright copper films can be produced by electroplating using an electroplating solution having a moderately high throwing power under the proper operating conditions, for example, a commercial acid copper sulfate electroplating solution having the proper additives to improve its throwing power. This solution allows reasonably fast plating to the desired thickness and does not attack the ceramic materials as do some solutions.

The electroplating operation can be performed using commercially available barrel plating equipment which consists of a small, plastic tumbling barrel which is immersed in a tank holding the copper electroplating solution. A batch of silvered ceramic capacitors are placed in the barrel along with small steel shot, in amounts such as to together occupy about one-half of the barrel's volume. The cathode connection is made via a drag chain in the barrel which contacts the shot which in turn contacts the silver metallization on the capacitors. Copper anodes are suspended in the tank away from the barrel. As the barrel turns, the tumbling action repeatedly makes electrical contact to various portions of the silvered surfaces via the steel shot and the copper is deposited as a conformal coating over all the surfaces of the silver end terminations, including the edges. The ceramic portions of the capacitor will not be coated with copper. While varying in thickness somewhat, the copper film will be of substantially uniform thickness. Depending on the electroplating solutions used and the operating conditions, conformal coatings having thickness of 0.2 or 0.3 mils can be produced in about 1 hour. Thereafter, the barrel is removed from the tank and washed. The steel shot can be removed magnetically and the conformally copper-coated chips washed and dried. If desired, the capacitors can be stored under oil or coated with any of the various commercial dip solutions for preventing oxidation until soldering.

What is claimed is:

1. A multilayer ceramic capacitor body comprised of stacked and sintered alternately arranged layers of ceramic material and metallic electrode material with alternate electrode layers disposed at opposite ends of the body, metallized coatings on the end faces of the body making electrical contact to the electrode layers disposed at the respective ends, said metallized coatings each extending over at least one edge to each partially overlap a portion of at least one side face of said body to form two spaced-apart solderable bonding pads on said face, said metallized end coatings each comprising a fired-on layer of silver particles bonded to the body by a frit and a thin copper film conformally coating the silver layers.

2. The article of claim 1 wherein the thin copper film is an electroplated copper film having an average thickness in the range of from 0.1 to 0.5 mils.

3. The article of claim 2 wherein the average thickness of the copper film is in the range of from 0.2 to 0.3 mils.

4. The article of claim 1 wherein a solder coating covers the conformal copper coating on the silver layers, and wherein a solder-copper alloy diffusion barrier is formed at the solder-copper interface.

5. The article of claim 1 wherein the ceramic capacitor body is a rectangular block-shaped body and wherein the metallized coatings thereon cover the opposite end faces and narrow overlapping strip portions extending around the side faces.